J. M. POOLE.

Machine for Grinding Rolls or Rollers.

No. 6,323. Reissued March 9, 1875.

Witnesses.
Jas. Martin Jr.
J. N. Campbell.

Inventor:
J. Morton Poole,
by Munn, Fenwick & Lawrence
Attys.

UNITED STATES PATENT OFFICE.

J. MORTON POOLE, OF WILMINGTON, DELAWARE, ASSIGNOR TO HIMSELF, WILLIAM T. PORTER, AND THOMAS S. POOLE.

IMPROVEMENT IN MACHINES FOR GRINDING ROLLS OR ROLLERS.

Specification forming part of Letters Patent No. 79,683, dated July 7, 1868; reissue No. 6,323, dated [illegible] 3, 1875; application filed January 29, 1875.

*To all whom it may concern:*

Be it known that I, J. MORTON POOLE, of Wilmington, county of New Castle and State of Delaware, have invented a new and improved Machine for Grinding Objects or Rolls Cylindrical; and I do hereby declare that the following is a full, clear, and exact description thereof, reference being had to the accompanying drawings making part of this specification, in which—

Figure 1:
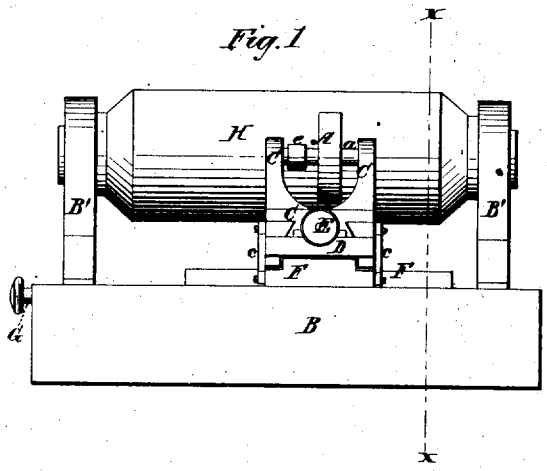
Figure 2:
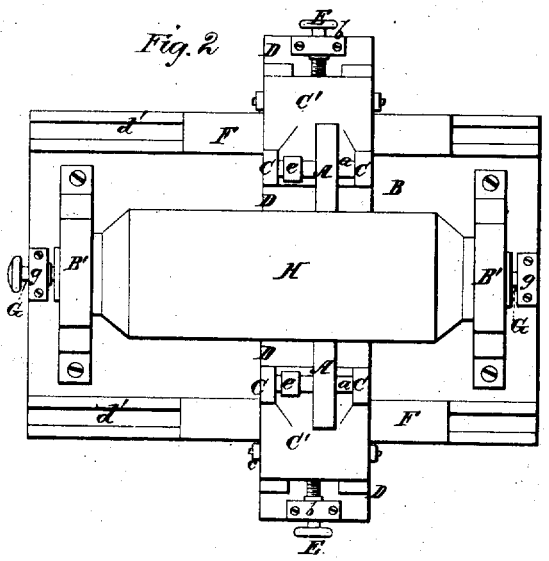
Figure 3:
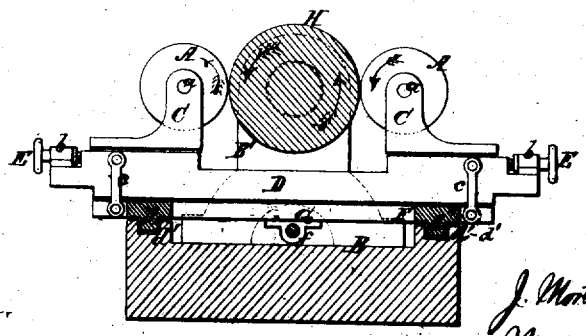

Figure 1 is an elevation of one side of those parts of the machine which are necessary to illustrate my invention, and showing an object in the act of being ground cylindrical. Fig. 2 is a plan view of the parts shown in Fig. 1. and of the object being ground cylindrical. Fig. 3 is a transverse section in the line *x x* of the parts shown in Figs. 1 and 2, and of the object being ground cylindrical.

Similar letters of reference indicate corresponding parts in the several figures.

This invention relates to a new and useful improvement which is designed to overcome certain difficulties hitherto experienced in machinery for grinding objects cylindrically true, which objects have seemingly to the eye, and even under the calipers, been turned, and then ground true in a lathe or machine having but one stationary turning-tool or grinding-wheel.

The greatest obstacle to overcome in said difficulties has arisen from the fact that it is impracticable to make a machine which always admits of the work being adjusted in it so as to be perfectly true with respect to other parts of such machine, for if the several parts composing the machine could be made to work perfectly true at first it is obvious that they would soon lose their truism, in consequence of the natural wear from one part moving upon another.

To overcome this difficulty I have resorted to the expedient of employing the roll or roller which is to be ground cylindrically true as the guide for the grinding-wheels during the operation of grinding off imperfections from the said roll or roller, which roll has previously been ground so as to be concentric at all points, but with a diameter which is not uniform throughout the length of the roll or roller. To do which, I place against such a roll or roller grinding-wheels which produce counter thrusts while revolving; and I also provide for confining any transverse movement, which imperfections in the machine create, to the carriage or support F of the grinding-wheels.

The nature of my invention consists, first, in a grinding-machine, for grinding rolls or rollers to a truly-cylindrical form, said machine having its grinding-wheels arranged to produce counter thrusts against the roll or roller being ground, and to maintain an equal distance between their points of contact and the axis of the said roll or roller (which roll or roller serves as a guide to the grinding-wheels) after they have been adjusted and fixed for grinding off said roll or roller to a given extent, while all transverse movement which may be created on account of imperfections in the truism of the machine, excepting that necessary for adjusting the grinding-wheels to their work, is confined to the carriage or support F of the grinding-wheels. Second, it consists in a revolving roll or roller, which is finally to become the cylindrically-true roll or cylinder of commerce, which my invention enables me to produce, as a guide for the grinding-wheels while employed in grinding the cylinder, as will be hereinafter described.

To enable others skilled in the art to make and use my invention, I will proceed to describe it.

A A are two grinding-wheels, placed on opposite sides of the axis of a centering supporting-bed, B B′. These wheels are fixed on spindles *a a*, which have their bearing on standards C of laterally-adjustable rests C′. The spindles support drums or wheels *e e*, around which are passed the belts, which give rotary motion to the grinding-wheels. The rests C′ and their standards are dovetailed upon a transverse bar or saddle, D, at each end of which is a bearing or box, *b*, having a screw-nut formed or set in it. Through each of these boxes a setting-up or hand adjusting-screw, E, is passed, and made to connect with or bear upon the rests of the standards.

The grinding-wheels and their adjuncts are loosely connected, by links or arms *c c*, to a carriage, F, of a bed, B, said bed having end centering and supporting standards B B′. The bed B may be of any required length and width, and is intended to be substantially supported upon a frame or stand, somewhat after the manner of constructing the frame and bed of a turning-lathe. Upon this bed the carriage F is guided by means of tenons *d* and grooved ways *d′ d′*, and is moved thereon longitudinally by means of a lead screw, G, which is tapped through an eye, *f*, upon the bottom of this carriage, and supported at its ends, by suitable bearings *g g*, upon the bed B. The bar or saddle D, carrying the grinding-wheels A A, retains a fixed relative position to the roll or roller upon the links *c c* of the carriage F while it is being moved longitudinally, and the said carriage F is capable of moving in a transverse plane to the axis of the roll or roller, independently of the saddle D, whenever any irregularity in the ways of the bed create such movement. It is by making provision for a transverse movement of the carriage F, without simultaneously imparting a similar movement to the grinding-wheels, that I am enabled to use grinding-wheels, which act with counter-thrusts and have their points of contact always at an equal distance from the axis of a roll which is to be ground cylindrically true. And this result is due to the employment of the bar or saddle D of the grinding-wheels in such a manner that the carriage or support F is free to follow the irregularities of the ways that it traverses without carrying transversely along with it the grinding-wheels. Thus a true cylinder is produced by the revolution of the grinding-wheels against the periphery of the roll or roller being ground, a result which would not be produced if the wheels, saddle, and carriage F, together, made a movement in a transverse plane.

If the ways of the bed B are made perfectly straight, the bar or saddle of the grinding-wheels rigidly fixed to the carriage F, and the axis of the roll or roller to be ground, perfectly parallel with the line of movement of this rest, it is evident that a perfectly cylindrical object could be obtained. But in practice it is found impossible to always make a bed perfectly straight; and even if it were possible, the varying travel of the carriage F during the grinding of rolls or rollers of different lengths would soon wear the parts out of true; therefore the importance of providing a means which will allow the carriage to follow any transverse movement created by imperfections in the machine proper, while at the same time the grinding-wheels are not affected by such movement, must be readily seen and appreciated.

The machine shown is specially adapted for grinding heavy rolls or rollers for different uses in the arts, such rolls or rollers being usually of such large diameter and of short length that they do not sag materially; and the leading object sought to be accomplished by my invention is to correct lateral surface irregularities.

In practice, the bearings or centering supports B′ B′ should be so constructed that the work can be readily introduced into the machine and removed therefrom.

The roll or roller H is first turned so true in a lathe with a single tool that it, to the eye, or under the application of the calipers, appears to be a true cylinder, whereas, in fact, it, while being truly circular at points between its ends, is not uniform in diameter; or the roller or roll H is thus ground in my machine with one of the grinding-wheels thereof after the other has been thrown out of operation, the chance for vibration of the operating grinding wheel of said machine being prevented by locking the saddle.

The manner of locking the said saddle forms no part of my invention, and is only an incidental thing which becomes necessary when it is not convenient to grind in a lathe which has a stationary grinding-wheel which can be substituted for a turning-tool. Having obtained a roll or roller whose surface is concentric with its axis, while its diameter may be, and generally is, unequal at different points between the ends of the roll or roller, on account of imperfections of the said surface, such roll is centered in the machine upon the supports B′ B′, and the hand-screws E E turned until the grinding-wheels are set up against the highest concentric portion of the surface of the roll H. Care is had that the distance from the true center of the roll or roller to the center of suspension on each side of the respective grinding-wheels shall be equal at the start, so that the suspended saddle will hang in equilibrium. The grinding-wheels are fixed in this position, and belted so as to revolve. The roll or roller is also to be belted so as to revolve. It should be understood that every part of the surface of the roll or roller is concentric with its axis in transverse section, and that the irregularities to be corrected are variations in the diameter, therefore, in adjusting the grinding-wheels, they are brought, at the beginning of the grinding operation, with force enough to make the wheels cut properly, against that portion of the roll or roller which has the largest concentric diameter. This accomplished, the carriage or support F is fed forward by the lead screw G, and the grinding-wheels and roll or roller are caused to revolve, as indicated by the arrows. As the longitudinal movement of the said carriage slowly progresses, the grinding-wheels (which are made preferably of emery or corundum) grind away all the highest portions of the roll to a straight line with the lowest portions. In case it is necessary, the grinding-wheels are set up farther, one or more times, by the hand-screws, and made to operate upon the roll until perfection is obtained. If, during the movement of the said carriage F, the ways in which it travels deflect the tenons transversely, the said carriage will follow such deflection, and not disturb the true position of the saddle or bar D, or the true position in which the grinding-wheels have been set to revolve. This transverse movement is permitted by the links or arms *c* swinging on their upper pivots, and their lower pivoted ends following the transverse movement of the said carriage either to the right or left. It should be stated that the amount of surface ground from a roll or roller by the counter-thrusting grinding-wheels, at one pass of the grinding-wheels along the roll or roller, is so infinitesimally small—say, about one ten-thousandth part of an inch—that the eye, aided by a testing-instrument, can with difficulty detect it.

For performing the best work, I believe the best plan of arranging the counter-thrust grinding-wheels will be to have their axes in the same plane with the axis of the roll or roller H, as shown in the drawings.

By my invention rollers for calendering paper are produced with a periphery which is so truly cylindrical in form, that two of such rollers placed together, one upon the other, will touch on every part while revolving.

What I claim as new is—

1. A grinding-machine for grinding rolls or rollers cylindrically true, said machine having its grinding-wheels operating with counter-thrusts, and sustained by a suspended support on a reciprocating carriage, to which all transverse movement, which imperfections in the machine create, is confined during the contact of the grinding-wheels with the roll or roller being ground, substantially as described.

2. A revolving roll or roller, which finally becomes the cylindrically true roll or roller, as a guide for the grinding-wheels during the operation of said wheels of grinding off the imperfections of the surface of said roll or roller, substantially as described.

J. MORTON POOLE.

Witnesses:

ALFRED D. POOLE,
I. M. OCHELTREE.